Figure 1:
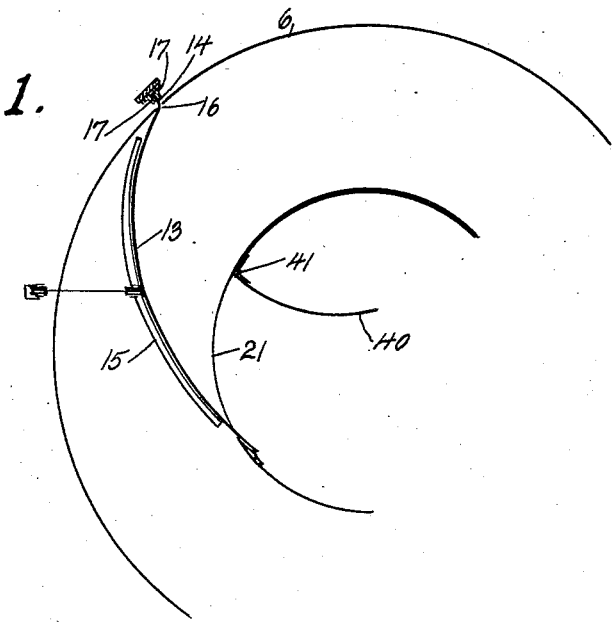

G. H. C. WILLIAMS.
SPIRAL GRAVITY CONVEYER.
APPLICATION FILED OCT. 10, 1908.

1,069,049.

Patented July 29, 1913.

Witnesses:
Ernest L. Gale, Jr.
James B. Bithold

Inventor:
G. H. C. Williams
By J. F. Rule,
Attorney

COLUMBIA PLANOGRAPH CO., WASHINGTON, D. C.

UNITED STATES PATENT OFFICE.

GEORGE H. C. WILLIAMS, OF METUCHEN, NEW JERSEY, ASSIGNOR TO OTIS ELEVATOR COMPANY, OF JERSEY CITY, NEW JERSEY, A CORPORATION OF NEW JERSEY.

SPIRAL GRAVITY-CONVEYER.

1,069,049.  Specification of Letters Patent.  Patented July 29, 1913.

Application filed October 10, 1908. Serial No. 457,031.

*To all whom it may concern:*

Be it known that I, GEORGE H. C. WILLIAMS, a citizen of the United States, residing at Metuchen, in the county of Middlesex and State of New Jersey, have invented a new and useful Improvement in Spiral Gravity-Conveyers, of which the following is a specification.

My invention relates to improvements in spiral gravity conveyers, adapted for use in stores, warehouses, manufacturing establishments and other buildings, for conveying packages, boxes, bags, bales or other merchandise by gravity from the various floors downward.

More particularly the invention relates to means for deflecting and discharging articles from a spiral conveyer at an intermediate floor or floors.

As shown in the drawings the invention is applied to an open spiral conveyer which as compared with the usual forms of inclosed conveyers results in a material economy of space, as well as a less expensive construction and one adapted for use in places where the usual inclosed conveyer could not be employed.

Figure 2:
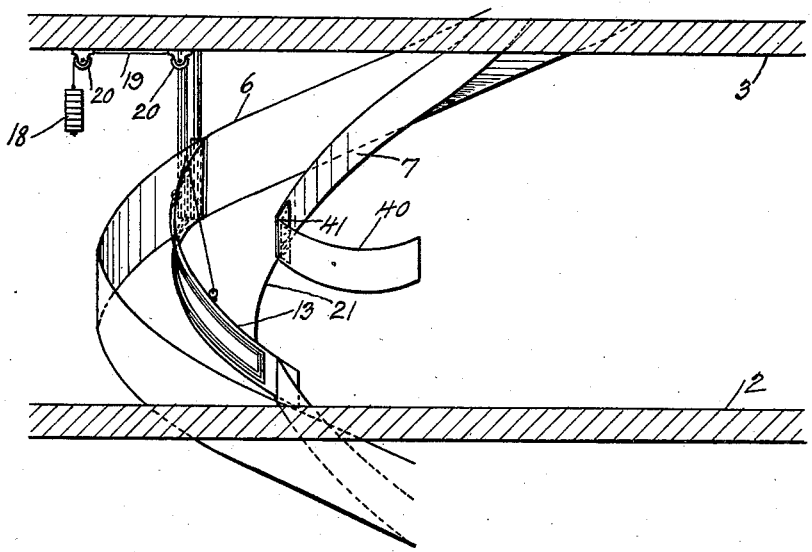

In the accompanying drawings, Figure 1 is a plan view of a portion of a conveyer embodying my invention; Fig. 2 is an elevation of the same showing in section two floors of the building through which the conveyer extends.

It will be understood that the conveyer may be installed in a building having any number of floors, and may be located in any convenient place in the building consistent with the architectural plan thereof.

The conveyer itself comprises a spiral conveying surface and vertically disposed outer and inner walls or flanges 6 and 7, respectively. The conveyer may be made of any kind of sheet metal, concrete, or other suitable material, as may be desired. The outer flange 6 is preferably made considerably higher than the inner flange in order to form more protection for the packages or other articles which are held by centrifugal force against this outer wall during their descent. The conveyer may extend through or between any number of intermediate floors 2 and 3 of the building, and at each or any desired number of intermediate floors is provided with a switch or deflector 13 which may consist of a curved sheet iron strip provided with a reinforcing strip 15. The outer end of the switch 13 has a flange 14 adapted to extend through a slot 16 in the outer wall of the conveyer, and is slidable vertically between the angle-iron or guides 17, these latter may extend up to the floor immediately above the switch. A counterweight 18 is connected to the switch 13 by means of a rope or cable 19 attached at its ends to the switch and counterweight, and extending over pulleys 20. The counterweight is preferably substantially the same weight as the switch 13, so as to hold the latter in position. When in use the switch 13 is moved down to the position shown in Fig. 2. Articles descending from an upper floor will then upon reaching the switch 13 be deflected inwardly and pass out through an opening 21 formed by removing a section of the inner flange 7. The flange 7 at the lower end of the opening 21 forms an abutment for the lower end of the switch. When not in use the switch can be moved upwardly out of the way. Additional guides or flanges similar to the guides 17 may be provided for the lower end of the switch if desired. The switch 13 may be so located between any two floors, as, for example, between floors 2 and 3, that articles may be delivered at the second floor from an upper story without in any way interfering with articles being deposited in the conveyer at the second floor to be carried to a lower floor or the main shipping room. With this arrangement one set of men at the intermediate floor can be employed in receiving goods from the upper floors at the same time that another set of men are shipping merchandise to the lower floor or main shipping room.

It will be understood that the conveyer may be provided with the usual or any suitable form of intake openings at the top or at intermediate floor landings to receive the articles to be conveyed.

A door 40 is sometimes desirable where large quantities of goods are being sent through the conveyer past the opening 21 and there is a tendency for boxes, packages, etc., in striking or moving past each other in their descent to be crowded out through the opening 21. The door 40 may be hinged at either end but preferably at the upper end, as at 41, to the flange 7, and may have the same radius of curvature as said flange to form a continuation thereof when the door is closed. Any suitable means may be provided for holding the door in its open and closed positions, it being held closed when the switch 13 is not in use.

It is obvious that my invention is not limited in its use to carrying packages, but may be employed to convey almost any kind of material from an upper to a lower floor.

Various modifications of the construction may be made to suit the conveyers for varying conditions found in practice, and numerous changes in the details of construction and arrangement of parts may obviously be made by those skilled in the art without departing from the spirit and scope of the invention. I wish, therefore, not to be limited to the particular construction herein disclosed.

What I claim as new and desire to secure by Letters Patent of the United States is:—

1. In a gravity conveyer, the combination with a spiral conveying surface, of a switch in position to discharge articles from said surface into the interior of the spiral.

2. In a spiral conveyer, the combination of a spiral conveying surface, and a switch movable into and out of operative position to discharge articles into the interior of the spiral.

3. In a gravity conveyer, the combination with a spiral conveying surface, of a switch vertically movable bodily into and out of position to deflect articles from said surface to the interior of the spiral, and a counterbalance weight connected to the switch and operable to hold the switch in its lifted position.

4. In a gravity conveyer, the combination with a spiral conveying surface, of flanges at the outer and inner edges of said surface, the continuity of the inner flange being broken to form a discharge opening, and a switch extending from the outer flange to the inner flange at the lower end of said opening.

5. In a gravity conveyer, the combination with a spiral conveying surface, of a switch movable vertically into and out of position to deflect articles from said surface into the interior of the spiral, and a counterbalance weight connected to the switch.

6. In a gravity conveyer, the combination with a spiral conveying surface, of an inner spiral flange therefor provided with an opening, and a door for said opening.

7. In a spiral conveyer, the combination with a spiral conveying surface, of a spiral wall or flange extending along the inner edge of said surface and discontinued to form a lateral opening to the conveying surface, and a door for said opening hinged to said wall or flange.

8. In a spiral conveyer, the combination with a spiral conveying surface, of inner and outer side walls or flanges for said surface, the inner wall being formed with a discharge opening, a switch movable into and out of position to discharge articles from the conveyer through said opening, and a door movable into and out of position to close said opening.

In testimony whereof, I have signed my name to this specification in the presence of two subscribing witnesses.

GEORGE H. C. WILLIAMS.

Witnesses:
W. H. BRADY,
L. C. HILLS.

---

Copies of this patent may be obtained for five cents each, by addressing the "Commissioner of Patents, Washington, D. C."